United States Patent [19]
Jenks, deceased et al.

[11] 4,361,533
[45] Nov. 30, 1982

[54] METHOD FOR MAKING RACKET FRAMES

[75] Inventors: Herbert R. Jenks, deceased, late of Carson City, Nev.; by Betty J. Jenks, executrix, Reno, Nev.

[73] Assignee: AMF Incorporated, White Plains, N.Y.

[21] Appl. No.: 207,495

[22] Filed: Nov. 17, 1980

[51] Int. Cl.³ .......................... B29C 7/00; B29D 3/02
[52] U.S. Cl. .................................. 264/258; 156/173; 156/229; 156/245; 264/288.4; 264/313; 264/319; 264/334
[58] Field of Search ............... 264/257, 258, 259, 263, 264/267, 313, 318, 248, 295, 338, 320, 322, 334, 342 R, 345, 348, 288.4, 319, 137; 273/73 C, 73 F, 73 R, 73 G, 67 R, DIG. 7, 73 D

[56] References Cited
U.S. PATENT DOCUMENTS

| | | | |
|---|---|---|---|
| 1,563,529 | 12/1925 | Satterlee | 264/313 |
| 3,234,309 | 2/1966 | Gräff | 273/73 F |
| 3,270,111 | 8/1966 | Haldeman | 264/258 |
| 3,294,887 | 12/1966 | Altermatt | 264/257 |
| 3,641,230 | 2/1972 | Jenks | 264/314 |
| 3,795,559 | 3/1974 | Horn et al. | 264/313 |
| 4,183,776 | 1/1980 | Staub et al. | 264/313 |
| 4,204,681 | 5/1980 | Hall et al. | 273/73 D |
| 4,264,389 | 4/1981 | Staub et al. | 264/258 |

FOREIGN PATENT DOCUMENTS

| | | | |
|---|---|---|---|
| 208945 | 3/1956 | Australia | 273/73 C |
| 2721715 | 12/1977 | Fed. Rep. of Germany | 273/73 C |
| 1312543 | 4/1973 | United Kingdom | 273/DIG. 7 |

OTHER PUBLICATIONS

Anon. Mod. Plastics Handbook, McGraw Hill N.Y. (1966) pp. 30 & 31 Relied On.

*Primary Examiner*—Willard E. Hoag
*Attorney, Agent, or Firm*—Walter R. Pfluger

[57] ABSTRACT

Two small diameter fiberglass tubes are rolled on silicone rubber slugs and inserted into a larger cylinder which is then pinched into a figure-8 shape. This is put in the curing mold. When heated the silicone rubber expands to push the fiberglass into contact with mold surfaces. After cooling the slugs can be pulled lengthwise, which reduces their diameter so they are self freeing from within the cured frame.

6 Claims, 14 Drawing Figures

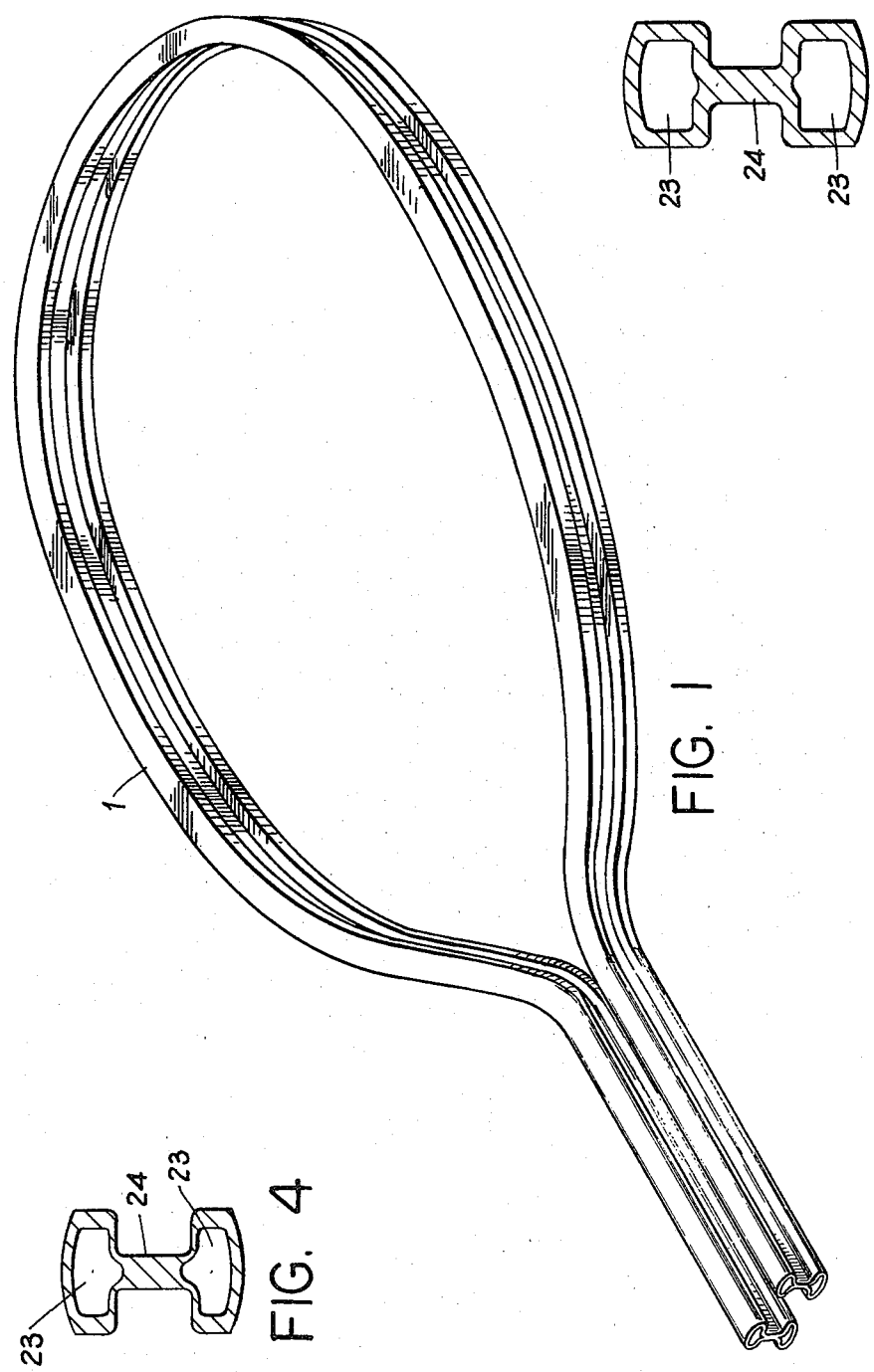

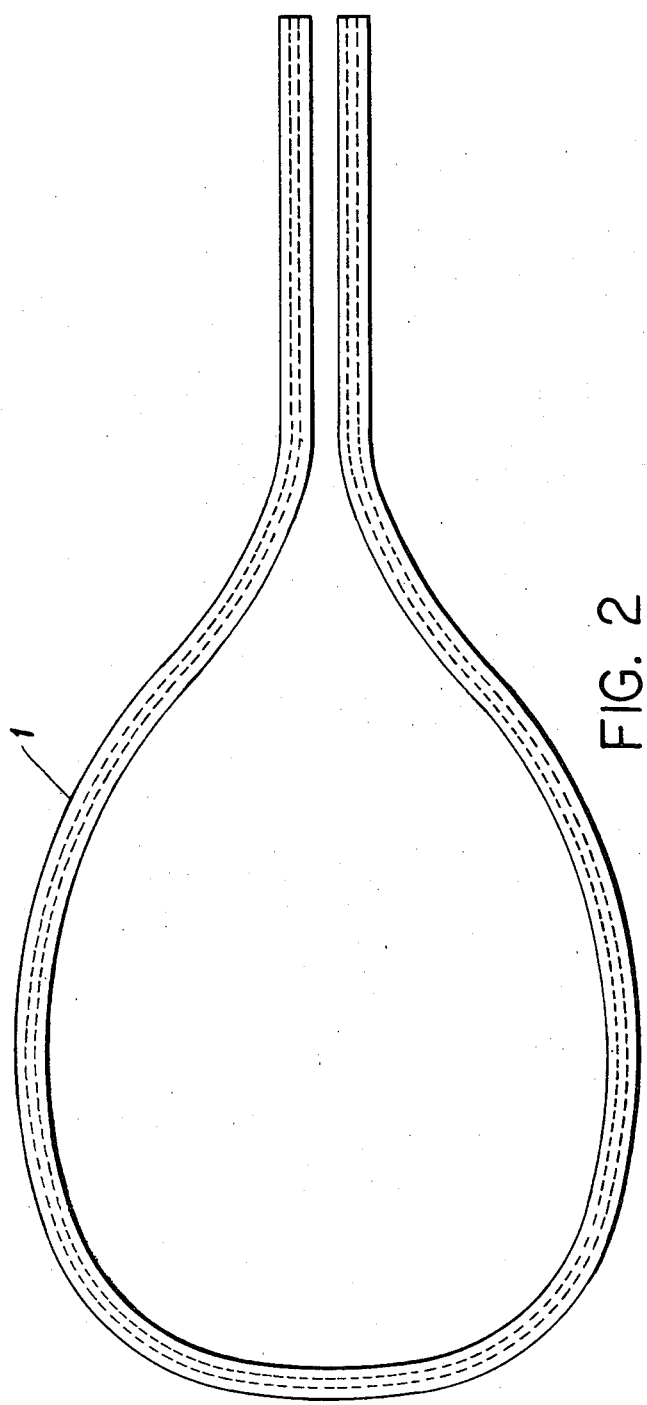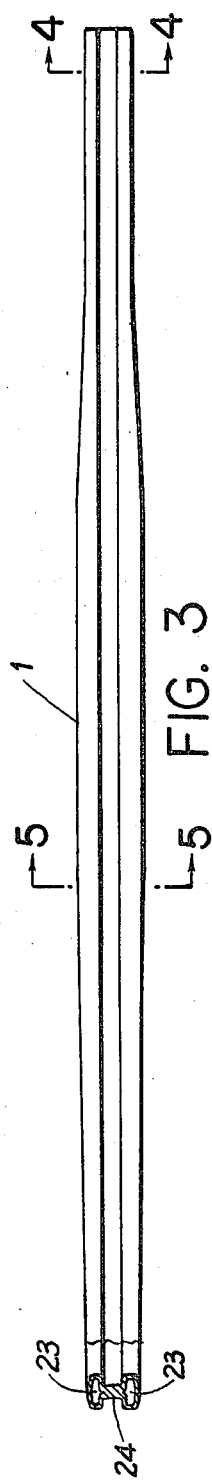

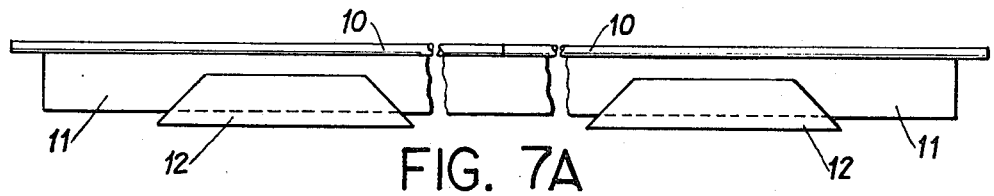
FIG. 7A
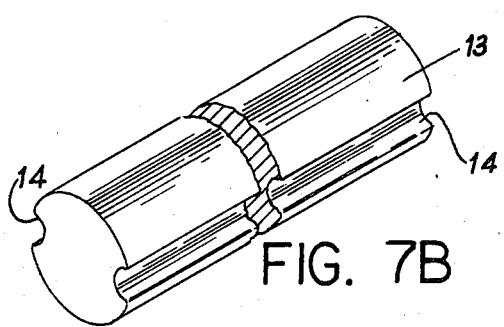
FIG. 7B
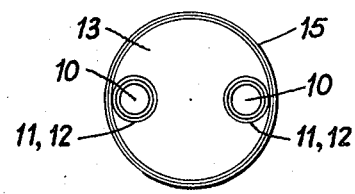
FIG. 7C
FIG. 7D
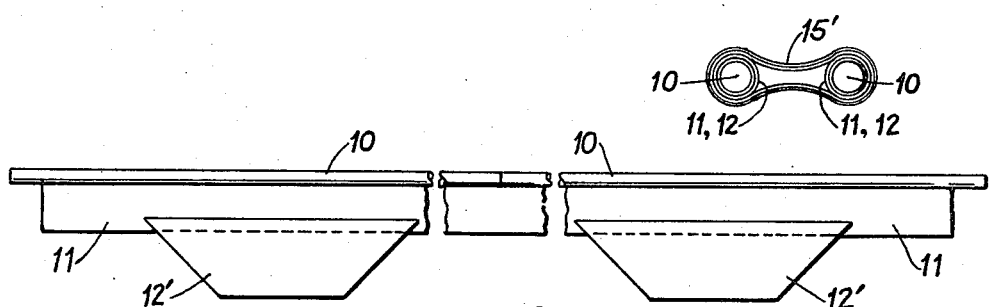
FIG. 8A
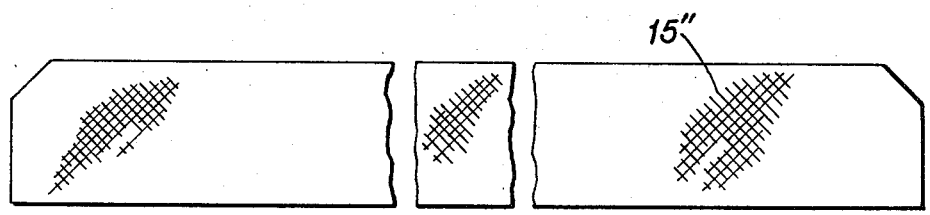
FIG. 8B
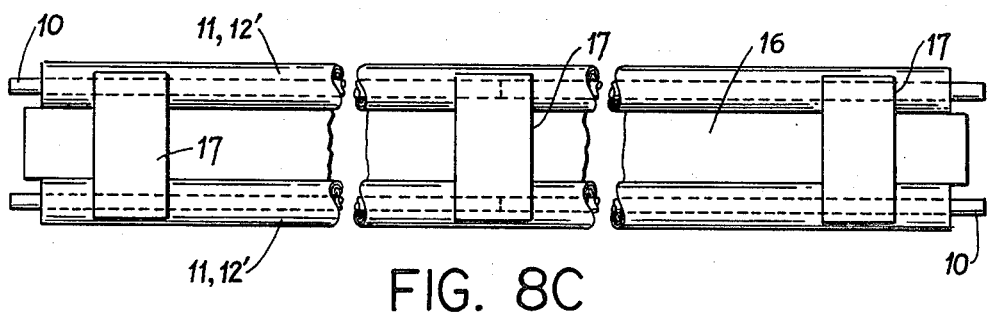
FIG. 8C

METHOD FOR MAKING RACKET FRAMES

This invention relates to rackets such as tennis and racquetball rackets, and more particularly, to an improved method of making the racket frames.

It is an object of this invention to provide an improved and low cost method of repetitively manufacturing high quality all fiberglass racket frames.

The invention will be best understood by considering the following detailed description thereof taken in connection with the accompanying four sheets of drawings in which:

FIG. 1 is a perspective view of the all fiberglass racket frame to be manufactured;

FIG. 2 is a plan view of the racket frame;

FIG. 3 is a broken away side view of the frame;

FIG. 4 is a sectional view of the frame along the section line 4—4 of FIG. 3;

FIG. 5 is a sectional view of the frame along the section line 5—5 of FIG. 3;

FIGS. 7A-7D are views of various steps of the method of fabricating the frame; and FIGS. 8A-8C are views of modifications in the method.

Figures 6A, 6B:
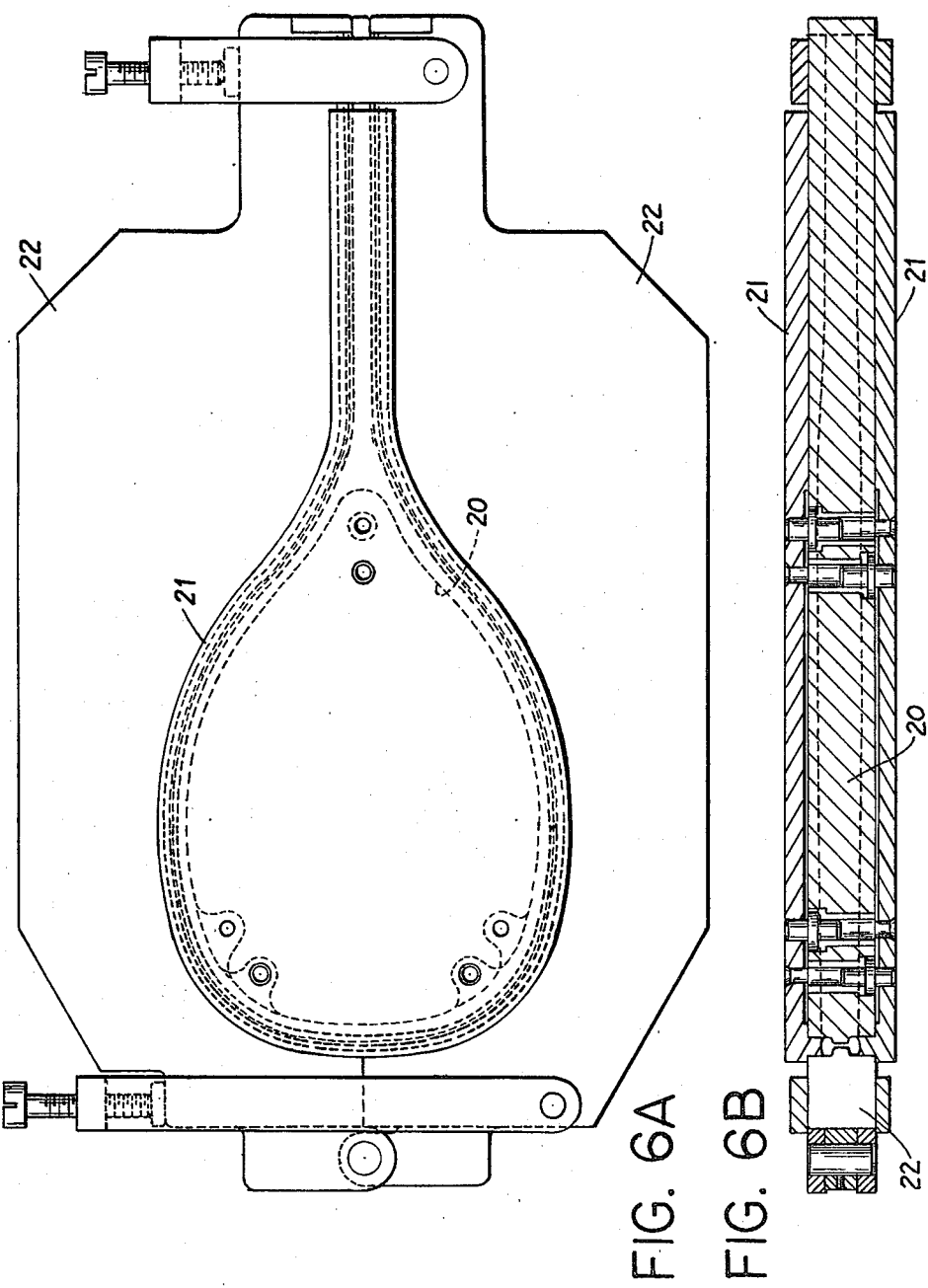
FIGS. 6A and 6B are plan and sectional views respectively of the 5 part mold or die used in forming the frame.

Referring first to FIGS. 1-5, shown therein is a racquetball racket frame 1 constructed from all fiberglass. The frame is also referred to by those skilled in the art as a "hairpin." This frame or hairpin is the basic building block in making a racquetball racket such as shown in Hall et al U.S. Pat. No. 4,204,681 granted May 27, 1980 and assigned to the same assigned as the instant invention. Briefly, as with tennis rackets, a (not shown) throat piece, handle, and stringing are added to the frame, all in a manner well understood by those skilled in the art. In that prior patent the frame is constructed from aluminum. In the instant invention the frame is constructed from all fiberglass with I-beam cross section to provide a very strong yet light weight frame.

Referring next to FIGS. 6A and 6B, shown therein is a 5 part mold or die for final forming the racket frame or hairpin. Briefly, the mold comprises a center section 20, 2 side sections 21, and 2 hinged sections 22. These 5 parts together define the preselected size, shape, surfaces, curvature, thickness, configuration, etc. desired in the final product. This is to say, when taken in connection with the to be described method, in the invention it is possible to make a frame on a repetitive low cost factory production basis and still have a high fidelity to the final design selected as represented by the frame shape incorporated into the 5 part mold.

Turning now to FIGS. 7A-7D for a description of a first embodiment of the invention, briefly, the hairpin shape is first initially formed by a series of steps employing elongated slugs of silicone rubber and strips of epoxy resin impregnated fiberglass, called "prepreg" by those skilled in the art. The fiberglass strips are rolled into elongated tubes on the rubber slugs. Two small tubes are formed, and a larger one. The two smaller ones are nested inside the larger one. After this the rubber slug in the larger tube is withdrawn and the larger tube is then pinched lengthwise thereof into a figure 8 cross section. This figure 8 cross section is then mounted about the center part 20 of the 5 part mold, the other mold parts 21, 22 added, and then the mold is heated. During heating the 2 remaining rubber slugs inside the figure 8 cross section expand by as much as 25%. This causes the fiberglass to be urged into intimate internal pressure contact with the interior surfaces of the 5 part mold so that the resultant racket frame or hairpin has a very high fidelity to the selected final design, and on a consistantly repetitive basis. After the mold is cooled the 2 slugs remaining in the hairpin shape can be readily withdrawn. This is done by pulling on their ends. When they are pulled they stretch in a lengthwise direction, which reduces their cross section. So, with a reduction in their diameter they readily release from the interior surfaces of the 2 continuous hollows 23 (see FIG. 1) in the hairpin so they can be readily withdrawn therefrom.

In particular, and still referring to FIGS. 7A-7D, in FIG. 7A is shown the lay up of the various parts that go into forming one of the 2 smaller tubes. Parts 10 are 2 silicone rubber rods laid end to end. Parts 10 have an O.D. of 0.230" and are each 25" long. Part 11 is a strip of unidirectional fiberglass (prepreg) 1½" wide and 43" long. Parts 12 are 2 unidirectional prepregs having an isoceles trapezoidal shape, 1¾" wide ×4"×8". Parts 12 are positioned on the strip 11 about 5" from their opposite ends which is a position that corresponds to the throat area of the finished racket frame or hairpin. The parts 11 and 12 are rolled about the rods 10 into a tubular shape. This process is repeated to form a second identical fiberglass tube.

These two smaller tubes, with silicone rubber rods positioned therein, are then nested in a silicone master rod 13, see FIG. 7B. Rod 13 has an OD of about 0.89" and is 48" long. As shown, it has 2 diametrically opposite positioned lengthwise extending curved grooves 14 formed therein. The two smaller tubes formed in the FIG. 7A method steps are nested in these two grooves 14 and then a strip of bias cut woven prepreg fabric 8" wide and 43" long is wound thereabout in the manner of FIG. 7A into a larger tubular shape. This is shown in FIG. 7C. A larger bias cut fiberglass tube 15 has been rolled about the master rod 13, and nested therein are the two smaller tubes built up out of strips 11, 12; the two smaller tubes 11, 12 being positioned on opposite sides of the larger tube 15. The tubes 11, 12 and 15 comprise a plurality of turns or layers of fiberglass. The unidirectional fiberglass pieces 11, 12 primarily give longitudinal strength to the finished product, whereas the bias cut woven fabric fiberglass of tube 15 gives both longitudinal and transverse or cross strength, the fibers thereof crossing each other and at angles of about 45° relative the length thereof.

Referring now to FIG. 7D, after the step of FIG. 7C the master rod 13 is pulled out of the tube 15 and then tube 15 is formed into the figure 8 shape 15' of FIG. 7D. Since the master rod 13 is rubber when it is pulled lengthwise it stretches. This reduces its diameter so that it readily releases from within the tube 15. When this is done the ends of tubes 11, 12 are held so that they and their rods 10 stay in place. The figure 8 shape 15' of FIG. 7D is formed by centrally pinching the outer tube 15 along its length, while making sure that the two inner tubes 11, 12 stay in place on opposite sides of the figure 8 After this the subassembly shown in FIG. 7D is then placed about the center part 20 of the mold, the side parts 21 thereof added, and then placed in the hinged sections 22 to close the mold, and then it is heated. This results in the final shape shown in FIGS. 1-5, the shape being a "hairpin" with I-beam cross section. This I- cross section is hollow at its top and bottom or bases, and the hollow bases are interconnected by a web 24 of double thickness, the reason for the extra thickness in the web being apparent from FIG. 7D. I-beams are noted for their strength, and the extra thick web 24 is desired since the string holes for stringing the racket will be formed in the web.

The silicone rubber rods or slugs 10, 13 are made from General Electric SE 466IU, SE 4594U or SE 476U silicone rubber compound. Luperco CST catalyst is added thereto, the material is milled, and then extruded and precured into the shape and dimensions previously mentioned. Luperco CST catalyst is available from Ram Chemicals Div. of Wittaker Corp. of Gardena, Calif. The mix is 1 part Luperco to 100 parts silicone rubber compound, a synthetic rubber.

The parts 11, 12 have a weight of 0.96 lbs./sq. yard and are available under the brand name Fiberite from West Coast Corp. of Orange, Calif. under their product code #1543/7701. The bias cut material that goes into making the tube 15 has the same weight and is available from the same company under their product code #1581/7701.

Some details, which may or may not be obvious to those skilled in the art, should be mentioned. In FIG. 7A the rods 10 are pre-warmed to approximately 160° F. to increase adhesion of the strip 11 thereto. Rolling of strip 11 on to the rods 10 can be started by using a warm iron to tack the strip edge to the rods. When the strip edge is evenly tacked under the rods the trapezoidal pieces 12 can then be inserted into positions between the strip 11 and rods 10 having at least one turn of strip 11 thereon at that time. By tack is meant sticking the strips to the rods. Prepreg is sticky, but by warming the same and the rods the parts will stick to each other even better. The rolling can be done by hand, but better still if it is done on an elongated heated roller press to get neat snug turns the whole length of the tube.

In the method step of FIG. 7C the silicone master rod 13 is prewarmed to about 140° F. The inner 11, 12 tubes with their silicone rods 10 are laid in the grooves 14 of FIG. 7B taking care not to twist the inner tubes to avoid unwanted distortions. In FIG. 7D when pinching the outer tube into a figure 8 shape 15' maximum separation between the two inner tubes should be maintained. The shape of FIG. 7D can be placed in a cold forming mold press for about one minute so that it holds its shape while it is being assembled into the curing mold of FIG. 6A-6B. It will be noted that 4 silicone rods 10 will protrude out from the right hand end of the mold, 2 for each tube 11, 12. It will be recalled that in FIG. 7A a pair of rods 10 were laid end to end for each tube 11, 12. In other words the silicone slugs for each tube 11, 12 are split at a point corresponding to the midpoint of the curved part of the hairpin. Therefore, the rods 10 can be readily pulled out of the hollows 23 of the I-beam shape. The FIG. 7D and hairpin shape is cured in the mold of FIGS. 6A-6B by first heating the mold to about 300° F. and then holding this temperature for about 30 minutes. Since the rods 10 expand when heated, the mold has to be cooled down before they can be withdrawn. The rods 10 are withdrawn from the hairpin while the mold is cooled, but still closed.

A second embodiment showing modifications in the method will now be described by referring to FIGS. 8A-8C. However, it should be first stated that one of the advantages of the process of the invention is that it makes it possible to readily vary the shape and cross section at any point in the hairpin, or to increase strength and add or subtract stiffness. Obviously different mold shapes can be used, but more important, is that variations or adjustments in the racket frame can be made by altering the lay up of the materials. That is to say, at this stage different cuts or shapes of fiberglass strip can be used, added, or subtracted, and the number of turns of fiberglass can also be varied.

For example, in FIG. 8A is shown a variation on the step of FIG. 7A wherein the trapezoidal pieces 12' are differently positioned. That is to say, they have been reversed and are aligned with the bottom edge of strip 11 instead of its upper edge. This means that strip 12' is wound about strip 11 after it is first rolled into a tube. By contrast, in FIG. 7A the turns of strips 11, 12 are interleaved.

In FIG. 8B is shown a bias cut woven fabric prepreg strip which is sized slightly different from that previously described with respect to FIGS. 7C and 7D. That is to say, it is slightly wider, $8\frac{3}{8}"$ versus the previous 8", and it's been cut off at two of its opposite corners, the triangular cutouts being $4\frac{1}{2}"$ long at the ends of the strip and 6" long at the top of the strip. However, the direction of the fibers is still the same, as indicated by the crossed lines 15".

Comparing FIGS. 8A and 7A, in the former it may be easier to roll the tubes without introducing any crinkles or bunching in the layer turns. In FIG. 8B the triangular cutouts make for a weight reduction while still not sacrificing strength in the hairpin since the cutouts are at the extreme butt or handle end of the hairpin. This makes it possible to add more material in other areas while still not increasing the weight of the hairpin.

The most significant difference between the method of FIGS. 7A-7D and FIGS. 8A-8C is illustrated in FIG. 8C. Briefly, a silicone master rod such as 13 of FIG. 7B is still used, but without the grooves 14. The bias cut fabric is still roll formed on the master rod, but the inner tubes with their rods are inserted therein after the larger tube is first formed. In FIG. 8C is shown the formed inner tubes 11, 12' with protruding silicone rubber rods 10. These two tubes are spaced from each other by an interim elongated wood or the like space or strip or block 16. This is to keep the two inner tubes aligned in parallel spaced relationship the required distance for fitting into the separately formed larger tube. Spacer strips 17 of prepreg are tacked to the 2 inner tubes to keep them aligned. Thereafter, the subassembly of 10, 11, 12', 17 is inserted into the preformed outer larger tube, which however, has had its silicone master slug or rod previously withdrawn. Since the prepreg of the 3 tubes is sort of tacky, inserting of subassembly 10, 11, 12', 17 into the larger tube can be facilitated by first chilling the larger tube to make its interior turn less tacky. Of course, care has to be exercised when inserting subassembly 10, 11, 12', 17 into the larger tube to maintain the orientation shown in FIG. 8C so that when the outer tube is pinched lengthwise thereof into a figure 8 the relative position of the parts will be maintained as illustrated in FIG. 7D.

Other than this difference of not forming the outer tube with the inner tubes therein, the second embodiment of the invention is essentially like the first embodiment. One reason for the difference is cost, in that the grooved master rods 13 of FIG. 7B are more expensive and they do not have as long a life as plain master rods; and also, if the rods 13 become twisted or distorted then the same will be true of the inner tubes nested therein.

While embodiments of the invention have been shown and described, the true scope of the invention is set forth in the following claims:

I claim:

1. A method of making an all fiberglass racket frame having a general hairpin shape with I-shape cross section, comprising positioning two small inner tubes of prepreg fiberglass turns wound on inner solid silicone rubber rods in a large outer tube of prepreg fiberglass turns at opposite sides of said outer tube in spaced relationship, pinching said outer tube lengthwise thereof into a figure 8 cross section shape with said inner tubes with their inner rods being positioned at opposite ends of said figure 8 cross section shape, mounting said subassembly of figure 8 cross section shape with inner tubes and rods in a multipart mold having an interior cavity corresponding to said hairpin shape with I-shape cross section, heating said mold to cure said fiberglass and cause said silicone rubber to expand whereby said fiberglass is urged with internal pressure against the interior surfaces of said mold to form said fiberglass into said hairpin shape with I-shape cross section having opposite hollow ends interconnected by an integral web, cooling said mold, and then pulling lengthwise on said silicone rubber rods to reduce their diameter to free them from within the formed racket frame.

2. A method of making an all fiberglass racket frame having a general hairpin shape with I-shape cross section, comprising positioning two small inner tubes of prepreg fiberglass turns wound on inner solid silicone rubber rods in a large outer tube of prepreg fiberglass turns at opposite sides of said outer tube in spaced relationship, pinching said outer tube lengthwise thereof into a figure 8 cross section shape with said inner tubes with their inner rods being positioned at opposite ends of said figure 8 cross section shape, mounting said subassembly of figure 8 cross section shape with inner tubes and rods in a multipart mold having an interior cavity corresponding to said hairpin shape with I-shape cross section, heating said mold to cure said fiberglass and cause said silicone rubber to expand whereby said fiberglass is urged with internal pressure against the interior surfaces of said mold to form said fiberglass into said hairpin shape with I-shape cross section having opposite hollow ends interconnected by an integral web, cooling said mold, and then pulling lengthwise on said silicone rubber rods to reduce their diameter to free them from within the formed racket frame, and wherein said inner tubes with rubber rods are nested in diametrically opposite grooves of a larger solid silicone master rod having said grooves extending lengthwise thereof, said large outer tube being formed about said master rod with said inner tubes with rubber rods nested therein, pulling on the opposite ends of said master rod and outer and inner tubes and inner rods to reduce its diameter to free said master rod from within said large outer tube while still leaving said inner tubes with rods in said outer tube, and then pinching said outer tube to form said figure 8 cross section shape.

3. A method of making an all fiberglass racket frame having a general hairpin shape with I-shape cross section, comprising positioning two small inner tubes of prepreg fiberglass turns wound on inner solid silicone rubber rods in a large outer tube of prepreg fiberglass turns at opposite sides of said outer tube in spaced relationship, pinching said outer tube lengthwise thereof into a figure 8 cross section shape with said inner tubes with their inner rods being positioned at opposite ends of said figure 8 cross section shape, mounting said subassembly of figure 8 cross section shape with inner tubes and rods in a multipart mold having an interior cavity corresponding to said hairpin shape with I-shape cross section, heating said mold to cure said fiberglass and cause said silicone rubber to expand whereby said fiberglass is urged with internal pressure against the interior surfaces of said mold to form said fiberglass into said hairpin shape with I-shape cross section having opposite hollow ends interconnected by an integral web, cooling said mold, and then pulling lengthwise on said silicone rubber rods to reduce their diameter to free them from within the formed racket frame, and aligning said two inner tubes in spaced parallel relationship with respect to each other with fiberglass spacer strips spanning said inner tubes, inserting the subassembly of said inner tubes with inner rods and spacer strips lengthwise into said outer tube, and then pinching said outer tube into said figure 8 cross section shape.

4. A method of making an all fiberglass racket frame comprising the step of rolling a strip of longitudinal prepreg fiberglass about a pair of end butted solid silicone rubber rods starting at the lengthwise edge thereof into a fiberglass inner tube having a plurality of turns surrounding said end butted rods, repeating said step to form a second inner tube, positioning said two inner tubes with inner rods inside a larger outer tube of plurality of turns of bias cut woven prepreg fiberglass fabric, pinching said outer tube lengthwise thereof into a figure 8 cross section shape with said inner tubes with inner rods being positioned at opposite ends of said figure 8 shape, positioning said assembly of outer tube with pair of inner tubes and inner rods into a multipart mold having a hairpin shaped cavity with I-cross section shape, heating said mold to cure said fiberglass and cause said silicone rubber rods to expand, cooling said mold to shrink said rods, and then pulling lengthwise on said rods to reduce their diameter to free and withdraw the same from within the cured fiberglass frame.

5. A method of making an all fiberglass racket frame comprising surrounding a pair of spaced parallel inner tubes of prepreg fiberglass turns having inner solid silicone rubber rods with an outer tube of prepreg fiberglass turns, pinching said outer tube along the length thereof into a figure 8 cross section shape, heating said assembly of outer tube, two inner tubes, and inner rods in a mold having a racket frame shape with I-shape cross section to expand said rods and cure said fiberglass, cooling said mold to shrink said rods, and then withdrawing said rods from the formed racket frame in said mold by lengthwise pulling on the ends of said rods.

6. A method of making an all fiberglass racket frame comprising surrounding a pair of parallel and spaced solid silicone rubber rods having a plurality of prepreg fiberglass turns wound thereabout into a pair of tubes with another tube of prepreg fiberglass, pinching said another tube lengthwise thereof into a figure 8 cross section having opposite hollow spaced ends connected by an integral web with said rods and their tubes being positioned at said hollow spaced ends, heating said figure 8 assembly of inner rods and their tubes and outer tube in a mold having a racket shaped cavity with I-shape cross section to cure the fiberglass of said turns and expand said rods to urge said fiberglass into intimate pressure contact with the interior surfaces of said mold, and then reducing the temperature of said mold to cool the formed racket frame in said mold and shrink said rods, and then withdrawing said rods from the frame in said mold by stretching the same lengthwise thereof to reduce the diameter of the same.

* * * * *